Patented June 16, 1931

1,810,746

UNITED STATES PATENT OFFICE

JULES BABIN AND ACHILLE PAYS, OF PARIS, FRANCE; SAID PAYS ASSIGNOR TO SAID BABIN

METAL SAWING MACHINE WITH ARCUATE CUT

Application filed October 6, 1925, Serial No. 60,892, and in France October 15, 1924.

Our present invention relates to metal sawing machines in which a reciprocating saw engages the work at a varying angle, each of the teeth of the blade being caused to operate thereon in a given portion of the arcuate cutting path.

One particular machine of this type has been disclosed in the application for United States Letters Patent, filed May 31, 1923, Ser. No. 642,667.

Hitherto these machines have been provided with the same kind of saw blades as machines with rectilinear cut, that is to say blades with saw teeth arranged uniformly in the same direction.

Now experiments have shown that these saw blades when applied to arcuate cutting, do not operate efficiently by reason of the curvature of the cutting path, and that they wear only upon the half of their length, viz, that corresponding to the second half of the cutting stroke. In fact, due to the varying inclination of the saw blade, the normal component acting to make the saw bite is much greater during the second half of the working stroke than during the first half.

We have discovered that it is possible to obviate this disadvantage by replacing the saw blades with uniform teeth by blades in which the two halves are toothed in opposite directions; it is found then that the amount of wear is regular and that it is unnecessary to weight or load up the saws. They can therefore be given for equal work a thickness less than that of the blades usually employed, this alteration resulting in the reduction of the proportion of waste.

These saw blades, working both on the forward and on the return cuts, under a small loading, do not require any lifting or relieving device; this allows simplification of the machine to which they are to be fitted.

It has already been proposed to provide wood sawing machines having mechanical feed, with saw blades toothed in one direction for half their length and in the opposite direction for the other half; but that proposal had merely for its object to obtain saw blades cutting in both directions and thus to prevent excessive pressure upon the saw being produced during the return stroke, while the work continued to advance. The purpose in view in that case was thus clearly different from that explained above, which is limited to metal sawing machines cutting in an arcuate or curved path.

The accompanying drawing shows by way of example one way of carrying out the present invention.

Figure 1:
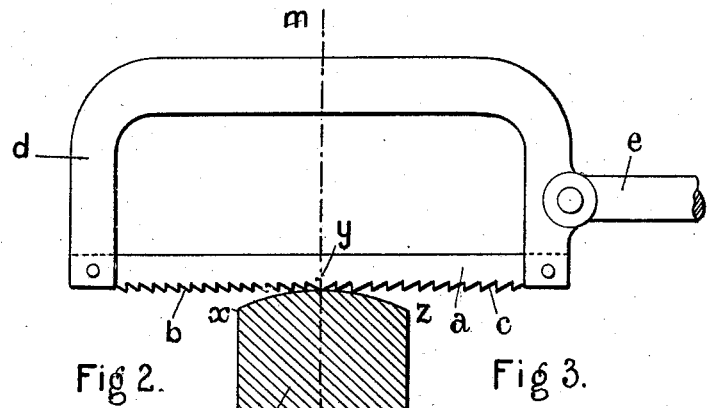
Figure 2:
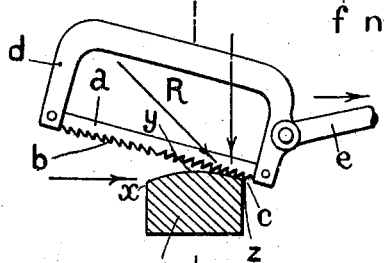
Figure 3:
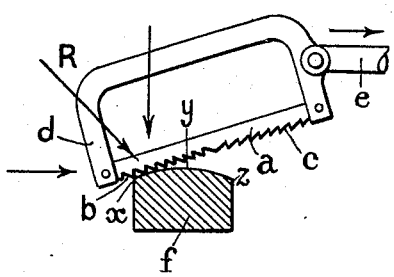

Figure 1 represents a saw, provided with this form of blade, in position at the middle of its stroke.

Figures 2, 3, 4 and 5 indicate the positions successively occupied by the saw during its reciprocating movement.

Figure 6:
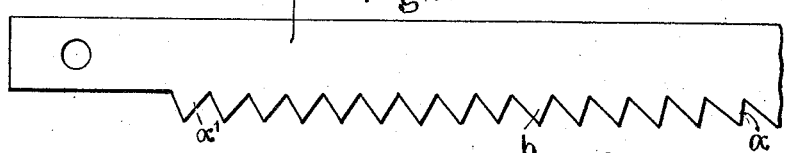

Figure 6 is a modification of Figure 1 on a larger scale.

Referring to Figure 1, it will be seen that the teeth of the saw blade $a$ are arranged in the following manner:—the teeth $b$ situated to the left of the centre-line $m$—$n$ are formed in such a way as to cut when the blade travels from left to right, whereas the teeth $c$ situated to the right of the line $m$—$n$ are formed in such a way as to cut when the blade travels from right to left.

The blade $a$ is tensioned between the arms of the frame $d$ which performs a reciprocating movement under the control of the connecting rod $e$. By suitable means, not shown in the drawing but differing according to the type of machine, the saw frame $d$ is guided in such a way that the blade $a$ operates upon the bar to be cut, as $f$ at a varying angle so that the cut assumes the shape of the arc $x$ $y$ $z$.

The saw is subjected on the one hand to a vertical force, always in the same direction, due to the weight of the mounting, and on the other hand to the horizontal driving force, which changes direction at every stroke. The resultant R of these forces is inclined in relation to the vertical, from the direction opposite to that of the movement of the saw. It can be resolved in its turn into two other forces, one along the blade, the other perpendicular to the blade, this second "normal" component acting alone to make the saw bite.

Now at the beginning of the forward stroke (Figure 2), the resultant R being nearer to the tangent to the curve *x y z* than at the end of this stroke (Fig. 3), by reason of the curvature of the path, the component along the normal to this path must be far greater during the second half of the stroke than during the first half.

In the first phase (Fig. 2), the half of the saw teeth which follows the path of the cut is turned oppositely to its working direction and therefore slips easily over the metal, the normal component having a low value.

In the second phase (Fig. 3), on the contrary, the teeth in the other half of the saw blade strike the work in their cutting direction and bite hard, the normal component of the forces exerted upon the saw being then greater than in the previous phase.

During the return stroke (from right to left in the drawing), the same effects are reproduced in the inverse manner.

Figure 4:
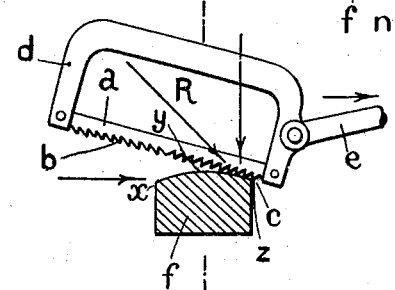
Figure 5:
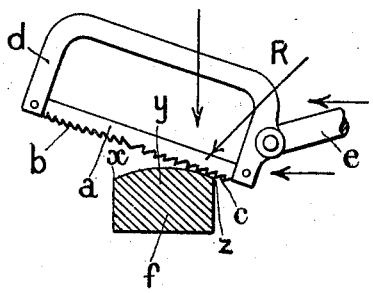

At the beginning of this stroke, the saw occupies the position of Figure 4, and its teeth slide along the portion *yz* of the cutting arc, the normal component of the forces being then at its minimum value.

During the end of the same stroke (Fig. 5), the teeth of the right half of the saw bite into the portion *x y* of the cut, the normal component of the forces being at its maximum.

Thus, in both directions, the saw slips during the first half of its stroke whereas it works during the second half and always in the most favourable conditions, without it being necessary to have recourse to a special lifting device with a view to preventing the saw blade from rubbing too hard upon the work when it is travelling oppositely to its working direction.

It is to be noted however that the force which is exerted normally to the blade, small at the start of each active half-stroke, increases during this half-stroke and attains its maximum at the end of the stroke.

If the teeth of the blade are arranged uniformly as in the example of Figure 1, the saw, biting at each instant according to the normal force to which it is subjected, will do more work towards the end of each active half-stroke than at the beginning, and the wear upon the teeth will therefore be not absolutely regular.

This can be remedied by giving the cutting faces of the teeth, in relation to the edge of the blade, an inclination increasing from the middle of the blade towards its extremities, the directions of these faces thus tending to converge upon a point beyond the back of the blade, instead of being parallel.

The teeth which are in engagement at the beginning of an active half-stroke will then make with the cutting path (to which the blade remains constantly tangential) an angle α greater than that (α1) which the extreme teeth make with this same curved line.

The cutting action of the teeth is thus in inverse ration to the force which presses the saw against the work; this eases the duty of the extreme teeth, regularizes the wear, and allows of increasing the speed of sawing.

What we claim is:

A reciprocating saw machine for the sawing of metals comprising a rectilinear saw blade having its two halves toothed in opposite directions, the arrangement of the cutting faces of the teeth of the saw blade having, in relation to the straight edge of the blade, an inclination increasing from the middle of the saw up to its extremities, and means for moving said saw blade to produce an arcuate cut in a stationary work piece.

In testimony whereof we have signed our names to this specification.

JULES BABIN.
ACHILLE PAYS.